3,120,549
PROCESS FOR THE REMOVAL OF AROMATIC IMPURITIES FROM LIQUID PHENYL METHYL POLYSILOXANES
Karl Wrabetz and Walter Simmler, Cologne-Mulheim, Germany, assignors to Farbenfabriken Bayer Aktiengesellschaft, Leverkusen, Germany, a corporation of Germany
No Drawing. Filed Mar. 2, 1961, Ser. No. 92,775
Claims priority, application Germany Mar. 8, 1960
13 Claims. (Cl. 260—448.2)

In the direct synthesis of phenyl chlorosilanes from silicon and chlorobenzene, diphenyl and its chlorine derivatives result as side-products, especially p-chlorodiphenyl and p,p'-dichloro-diphenyl, as well as p-dichlorobenzene. Since the boiling point of p-dichlorobenzene is close to that of the phenyl trichlorosilane and the boiling point of diphenyl and its chlorine derivatives is close to that of diphenyl dichlorosilane, the separation of the side-products from the silane derivatives by distillation is very difficult. If the phenyl chlorosilanes are reacted in the usual way to polysiloxanes, those side-products first remain therein. They can indeed be separated by evacuation and heating or blowing out from high molecular and heat stable siloxanes but not from low molecular weight polysiloxanes whose boiling range coincides with that of the aforesaid accompanying substances or from cross-linkable polysiloxanes which would be thereby spoiled for their later application. The removal of the side-products is however very desirable since they have an undesirable smell and are physiologically objectionable and can also give rise to corrosion.

The object of the invention is a process for the removal of aromatic impurities from liquid phenyl methyl polysiloxanes characterised in that the impure phenyl methyl polysiloxanes are subjected to extraction with a polyvalent alcohol, an amino alcohol, or a mono- or poly-amine, i.e. polyhydric lower alkanols, amino-lower-alkanols and amino-lower-alkanes.

It has been shown that phenyl methyl polysiloxanes which in contrast to pure methyl substituted polysiloxanes dissolve in a great number of organic liquids and thus also in the lower monovalent alcohols, are only sparingly soluble in polyvalent alcohols, amino alcohols, mono- and poly-amines, i.e., polyhydric lower alkanols, amino-lower-alkanols, and amino-lower-alkanes, whereas the aromatic impurities referred to above dissolve therein to a considerable extent, especially at elevated temperatures. For the two-phase systems to be used according to the invention, suitable distribution ratios were, therefore, determined, some of which are illustrated in the following table; the numbers, measured at 20° C. and at 90° C. result from the chlorine quantity in the extracting agent in each case divided by the chlorine quantity in the same volume, in equilibrium with the extracting agent, of a crude phenyl methyl polysiloxane oil of 20 centistokes viscosity (20° C.) and a phenyl methyl ratio of 1:5

| Extraction agent | 20° C. | 90° C. |
|---|---|---|
| 1,2-dihydroxyethane | 0.029 | 0.030 |
| 1,2,6-trihydroxyhexane | 0.035 | 0.087 |
| 1,2-dihydroxypropane | 0.11 | 0.16 |
| tri-(2-hydroxyethyl)-amine | 0.27 | 0.24 |
| 1-amino-2-hydroxypropane | 0.56 | 1.00 |
| 2-(β-hydroxyethylamino)-ethylamine | 0.75 | 0.81 |
| 1,2-diaminoethane | 1.34 | |

Since the chlorine is present in this case as a substituent in the aromatic hydrocarbons, with which the polysiloxanes are contaminated, the distribution ratio of the chlorine gives an index of the distribution of the impurities themselves.

As has been further found, the use of elevated temperatures in the extraction, offers the advantages that the formation of sharply defined layers of extract and raffinate is promoted and that by cooling the separated extract the impurities dissolved in it many be separated as another liquid phase.

The process can be operated in a known manner either intermittently or continuously; in both cases, for commercial reasons, the extraction agent can be conducted in a cycle, after it has been purified by distillation or the aforesaid cooling of the extract.

An apparatus used in the following examples consists of an upright cylindrical tube for extraction, fitted with a stirrer and steam heating coil, and having at the bottom end a conical taper, which is so connected through a U-tube with a distillation vessel that the latter is filled to approximately 70% of its volume, when the extraction tube is 80% full of liquid. From the vapour space of the distillation vessel a connection leads to the condenser for the vapour of the extraction agent which drops back into the extraction tube after condensation. During the continuous recycling of the extraction agent the phenyl methyl polysiloxane to be purified is passed through an upwardly directed nozzle at the bottom end of the extraction tube, and passes in the form of small drops by its own buoyancy through the denser layer of extraction agent, collects above the latter in a second layer and is finally taken off as raffinate through an overflow pipe.

If the length of the extraction tube extends over a few metres, such a counter-current cycle is sufficient; otherwise several such arrangements may be disposed one after another. After the last extraction the raffinate is washed with optionally acidified water to free it from traces of the extraction agent, and filtered over acid activated carbon or an otherwise unusual adsorbing agent.

The following examples are given for the purpose of illustrating the invention.

*Example 1*

A supply of 2.5 litres of an oil consisting of mixed condensed diphenyl siloxane and dimethyl siloxane units in a ratio of 1:5, having a viscosity of 20 centistokes (20° C.) which contained chlorinated aromatic impurities in such an amount that its chlorine content amounted altogether to 4% by weight was subjected to a continuously repeated extraction with 1,2-dihydroxy propane in the apparatus described above. For this purpose the apparatus was filled with 1.8 litres of the aforesaid extraction agent, and its distillation so controlled that 0.5 litre per hour of this liquid was conducted in a cycle and its temperature amounted to 90° C. on re-entry into the extraction tube. Simultaneously three litres per hour of the siloxane oil were fed in and after running through the extraction tube continuously introduced afresh under the extraction agent layer.

The establishment of stationary concentrations was observed by chlorine determination: the extraction agent distillate contained during the operation between 0.2 and 0.3% by weight of chlorine thus carrying a small quantity of the impurities with it in the cycle; the chlorine concentration in the extract amounted after half an hour's operation to 0.7% by weight, after 12 hours to 0.2% by weight, and had then reached a stationary value. The chlorine content of the raffinate was reduced to 1.2% by weight and could be further reduced by the use of fresh extraction agent.

*Example 2*

As extraction agent a mixture of 1,2-dihydroxy propane and the 3-fold volume of 2-(β-hydroxyethylamino)-ethyl-amine was used. 1.9 litres of the agent were charged into the same apparatus as in Example 1 but the distillation and the recycling were omitted for the sake of simplicity. Over a period of 1 hour, 0.2 litre of the same phenyl methyl polysiloxane as in Example 1 were fed in portions and gave in a single pass a raffinate containing 1.4% by weight of chlorine.

*Example 3*

In a flask of 6 litres capacity 1.8 litres of 2-(β-hydroxy ethylamino)-ethylamine and 1 litre of the same phenyl methyl polysiloxane oil as in Example 1 were stirred for an hour at a temperature of 90° C. regulated by a contact thermometer. The siloxane oil settling out as upper layer was syphoned off, washed with saturated common salt solution and filtered through a layer of a mixture of potassium sulphate and potassium hydrogen sulphate. The water-clear odourless filtrate contained 0.7% by weight of chlorine.

If the extraction was carried out under otherwise the same conditions but with only 0.6 litre of the phenyl methyl polysiloxane oil, a raffinate was obtained which contained only 0.4% by weight of chlorine.

We claim:

1. Process for the removal of aromatic impurities from liquid phenyl methyl polysiloxanes, which comprises subjecting the impure phenyl methyl polysiloxanes in the form of one organic liquid phase to an organic liquid phase-organic liquid phase extraction with a member selected from the group consisting of polyhydric lower alkanols, amino-lower-alkanols, and amino-lower-alkanes, as the other organic liquid phase.

2. Process according to claim 1 wherein the phenyl methyl polysiloxanes after extraction are washed, filtered, and recovered in substantially pure form.

3. Process for the removal of aromatic impurities from liquid phenyl methyl polysiloxanes, which consists essentially of subjecting the impure phenyl methyl polysiloxane to extraction with a member selected from the group consisting of polyhydric lower alkanols, amino-lower alkanols, and amino-lower alkanes, at a temperature of about 90° C., by passing the polysiloxane in the form of droplets upwardly through an elongated path containing a layer of the extraction agent, said polysiloxane collecting as a separate upper layer above the layer of extraction agent, and recovering the extracted polysiloxane from said separate upper layer substantially free from said aromatic impurities.

4. Process according to claim 3 wherein the phenyl methyl polysiloxanes after extraction are washed with acidified water, filtered over activated carbon, and recovered in substantially pure form.

5. Process according to claim 3 wherein the extraction layer containing the aromatic impurities therein is thereafter cooled to effect separation of the aromatic impurities therefrom and then said extraction member is recycled.

6. Process according to claim 3 wherein the extraction layer containing the aromatic impurities therein is thereafter distilled to effect separation of the aromatic impurities therefrom and then said extraction member is recycled.

7. Process for the removal of silicon-free aromatic contaminants from liquid phenyl methyl polysiloxanes, which consists essentially of subjecting the contaminated phenyl methyl polysiloxanes to a continuous multi-stage organic liquid-organic liquid extraction with 1,2-dihydroxyethane.

8. Process for the removal of silicon-free aromatic contaminants from liquid phenyl methyl polysiloxanes, which consists essentially of subjecting the contaminated phenyl methyl polysiloxanes to a continuous multi-stage organic liquid-organic liquid extraction with 1,2-dihydroxypropane.

9. Process for the removal of silicon-free aromatic contaminants from liquid phenyl methyl polysiloxanes, which consists essentially of subjecting the contaminated phenyl methyl polysiloxanes to a continous multi-stage organic liquid-organic liquid extraction with 1,2,6-trihydroxyhexane.

10. Process for the removal of silicon-free aromatic contaminants from liquid phenyl methyl polysiloxanes, which consists essentially of subjecting the contaminated phenyl methyl polysiloxanes to a continuous multi-stage organic liquid-organic liquid extraction with tri-(2-hydroxyethyl)-amine.

11. Process for the removal of silicon-free aromatic contaminants from liquid phenyl methyl polysiloxanes, which consists essentially of subjecting the contaminated phenyl methyl polysiloxanes to a continuous multi-stage organic liquid-organic liquid extraction with 1-amino-2-hydroxypropane.

12. Process for the removal of silicon-free aromatic contaminants from liquid phenyl methyl polysiloxanes, which consists essentially of subjecting the contaminated phenyl methyl polysiloxanes to a continuous multi-stage organic liquid-organic liquid extraction with 2-(β-hydroxyethylamino)-ethyl-amine.

13. Process for the removal of silicon-free aromatic contaminants from liquid phenyl methyl polysiloxanes, which consists essentially of subjecting the contaminated phenyl methyl polysiloxanes to a continuous multi-stage organic liquid-organic liquid extraction with 1,2-diaminoethane.

References Cited in the file of this patent

UNITED STATES PATENTS

| | | |
|---|---|---|
| 2,547,944 | Iler | Apr. 10, 1951 |
| 2,673,843 | Humphrey et al. | Mar. 30, 1954 |
| 2,852,484 | New | Sept. 16, 1958 |

OTHER REFERENCES

Lewis: "Jour. Am. Chem. Soc.," vol. 70 (1948),

UNITED STATES PATENT OFFICE
CERTIFICATE OF CORRECTION

Patent No. 3,120,549                          February 4, 1964

Karl Wrabetz et al.

It is hereby certified that error appears in the above numbered patent requiring correction and that the said Letters Patent should read as corrected below.

Column 2, line 7, for "many" read -- may --; line 38, for "unusual" read -- usual --.

Signed and sealed this 23rd day of June 1964.

(SEAL)
Attest:

ERNEST W. SWIDER                                  EDWARD J. BRENNER
Attesting Officer                                     Commissioner of Patents